United States Patent
Freeman

(10) Patent No.: US 7,673,739 B2
(45) Date of Patent: Mar. 9, 2010

(54) APPARATUS AND METHOD FOR IN-BELT CONVEYOR IDLER CONDITION MONITORING

(75) Inventor: Vincent Neil Freeman, Perth (AU)

(73) Assignee: Honeywell International Inc., Morristown, NJ (US)

( * ) Notice: Subject to any disclaimer, the term of this patent is extended or adjusted under 35 U.S.C. 154(b) by 76 days.

(21) Appl. No.: 12/025,141

(22) Filed: Feb. 4, 2008

(65) Prior Publication Data

US 2009/0194390 A1 Aug. 6, 2009

(51) Int. Cl.
*B65G 43/00* (2006.01)
(52) U.S. Cl. .............................. 198/810.02; 198/810.01
(58) Field of Classification Search ................ 198/820, 198/821, 824, 829, 810.01, 810.02, 502.1, 198/502.4
See application file for complete search history.

(56) References Cited

U.S. PATENT DOCUMENTS

| | | | | |
|---|---|---|---|---|
| 4,437,563 | A * | 3/1984 | Oriol | 198/810.02 |
| 6,047,814 | A * | 4/2000 | Alles et al. | 198/810.02 |
| 7,032,740 | B2 * | 4/2006 | Hochhaus et al. | 198/502.1 |
| 7,178,663 | B2 * | 2/2007 | Schnell | 198/810.02 |
| 7,275,637 | B2 * | 10/2007 | Brown | 198/810.02 |
| 7,494,004 | B2 * | 2/2009 | Stolyar et al. | 198/810.02 |
| 2006/0254885 | A1 | 11/2006 | Ziegler | |

FOREIGN PATENT DOCUMENTS

| | | |
|---|---|---|
| JP | 09-067009 A | 3/1997 |
| JP | 2006-052039 A | 2/2006 |
| JP | 2008-179447 A | 8/2008 |

OTHER PUBLICATIONS

"Flat Belt End Conveyor Sensors", http://www.sencon.com/en/end_make/flat_belt.html, Feb. 2008, 3 pages.
"Rip Detection with Sensor Loops", www.ConveyorBeltGuide.com, 2005, 2 pages.
"Sensor Guard with RFID Technology", http://www.goodyearep.com/productsdetail.aspx?id=7846, 2008, 5 pages.

* cited by examiner

*Primary Examiner*—James R Bidwell
(74) *Attorney, Agent, or Firm*—Munck Carter, LLP

(57) ABSTRACT

A method and system are provided for in-belt conveyor idler condition monitoring. A sensor is mechanically coupled to a conveyor belt and senses a characteristic of a support structure associated with the conveyor belt. The sensor wirelessly transmits a corresponding signal to a monitor system. The monitor system determines a condition of the support structure based upon the transmitted signal.

The support structure may be one of a plurality of support structures and characteristics of each of the support structures may be sensed, associated with identifiers for the support structures, and transmitted to the monitor system. The support structure may include a plurality of elements and a characteristic of each element may be sensed and transmitted by one of a corresponding plurality of sensors.

20 Claims, 2 Drawing Sheets

APPARATUS AND METHOD FOR IN-BELT CONVEYOR IDLER CONDITION MONITORING

TECHNICAL FIELD

This disclosure relates generally to monitoring systems and more specifically to an apparatus and method for in-belt conveyor idler condition monitoring.

BACKGROUND

Conveyor belts are used in many applications. In some applications, conveyor belts are used to transport bulk materials such as ore, coal and grain. Conveyor belts in such applications may be as long as 50 kilometers and may be installed in hazardous or environmentally unfriendly areas.

Typically, a conveyor belt is driven by a head pulley at one end and a tail pulley at the other end. Between the head pulley and tail pulley, idler rollers are typically used to support the belt. The idlers are typically mounted on a frame and rotate on bearings.

SUMMARY

This disclosure provides an apparatus and method for in-belt conveyor idler condition monitoring.

In a first embodiment, a method includes sensing a characteristic of a support structure of a conveyor belt using a sensor mechanically coupled to the conveyor belt and wirelessly transmitting a signal corresponding to the sensed characteristic. The method also includes determining a condition of the support structure based upon the transmitted signal.

In particular embodiments, the support structure is one of a plurality of support structures and characteristics of each of the support structures are sensed and associated with identifiers for the support structures. In other particular embodiments, the support structure includes a plurality of elements and each element is sensed by one of a corresponding plurality of sensors.

In a second embodiment, a system includes a conveyor belt, a support structure of the conveyor belt, a sensor mechanically coupled to the conveyor belt, and a monitor system. The sensor senses a characteristic of the support structure and wirelessly transmits a signal corresponding to the sensed characteristic to the monitor system and wirelessly transmits a signal corresponding to the sensed characteristic. The monitor system determines a condition of the support structure based upon the transmitted signal.

In a third embodiment, a system includes a sensor, a controller, and a wireless interface. The sensor is mechanically coupled to a conveyor belt, detects a characteristic of a support structure associated with the conveyor belt, and produces a first signal responsive to the characteristic. The controller receives and stores the first signal, and produces a second signal according to the stored first signal. The wireless interface receives and wirelessly transmits the second signal.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
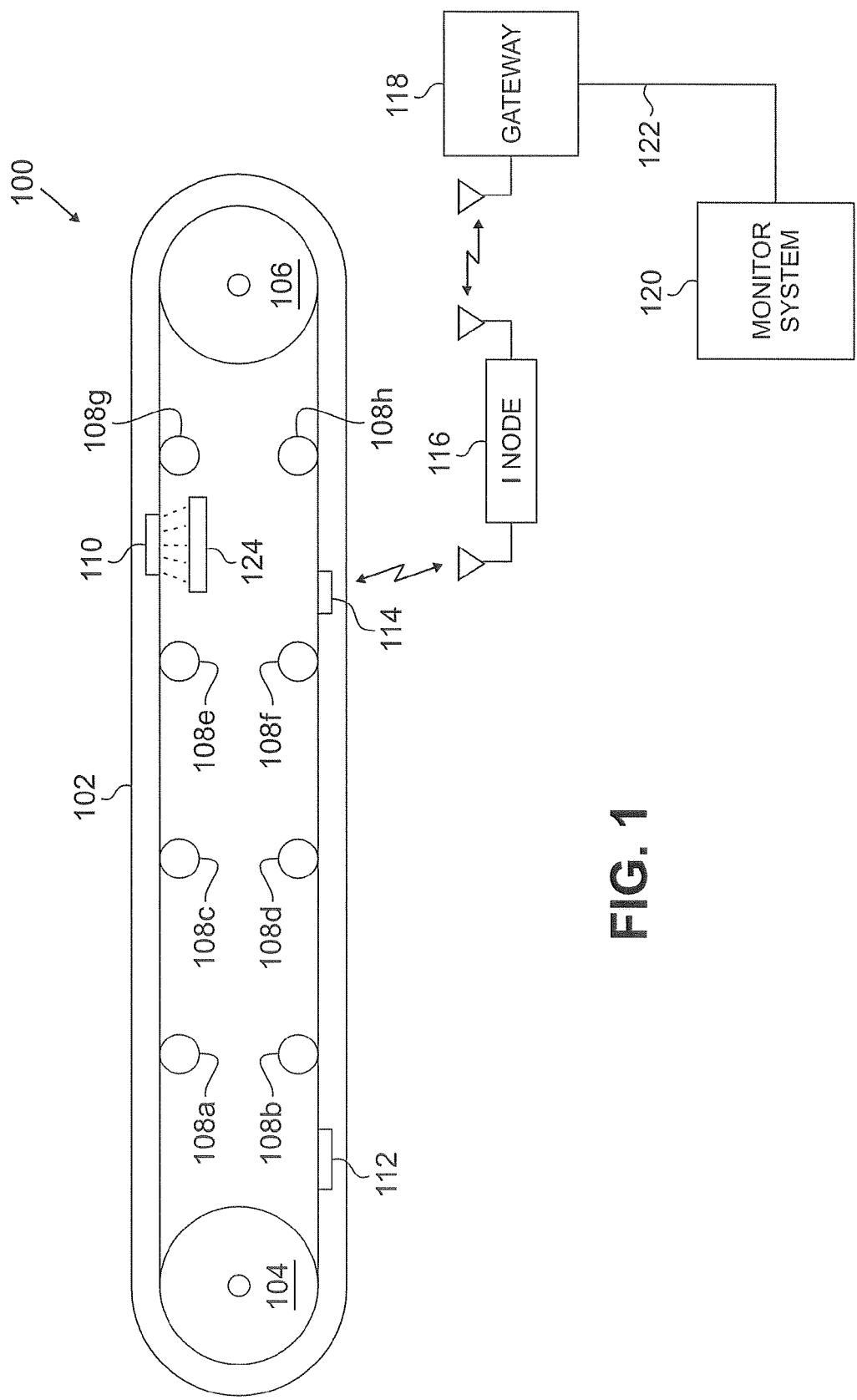
FIG. 1 is a schematic diagram of a conveyor belt system in accordance with this disclosure.

FIG. 1 is a schematic diagram of a conveyor belt system 100 in accordance with this disclosure. A conveyor belt 102 in accordance with this disclosure is installed around a head pulley 106 and a tail pulley 104. Between the head pulley 106 and the tail pulley 104, the belt 102 is supported by idler assemblies 108a-108h.

Idler wear or bearing failure may result in conveyor belt wear or misalignment. Idler failure may result in a torn conveyor belt, with attendant significant loss of production. In conventional conveyor belt systems, inspection of idlers may be infrequent or expensive for reasons that may include the harshness of the conveyor belt environment, the length of the belt system, the difficulty of inspecting idlers while the belt is in operation.

In an embodiment of the present disclosure, wireless sensor systems 110, 112 and 114 are embedded in the conveyor belt 102. As the sensors 110, 112 and 114 pass over each of the idler assemblies 108a-108h, the sensors 110, 112 and 114 sense one or more characteristics of the idler assembly and store the sensed information for later upload to a monitoring or control system. Uploading of stored information is performed when the sensor 114 comes within wireless communication range of a wireless communication node 116. Similarly, when the sensor systems 110 and 112 come within communication range of the i-node 116, they will perform an upload of stored information.

The node 116 may also be referred to as an intermediate node, or i-node. The node 116 is in wireless communication with a gateway node 118, which is in communication over a communication link 122 with a monitor system 120.

While the sensor 114 is shown communicating wirelessly with the i-node 116, it will be understood that in other embodiments, the sensor 114 may come within wireless communication range of, and communicate directly with, the gateway 118. Furthermore, where the i-node 116 is not in wireless communication range of the gateway 118, additional i-nodes may serve to relay wireless communications between the i-node 116 and the gateway 118.

While the conveyor belt 102 is shown with three wireless sensors in FIG. 1, it will be understood that in other embodiments, fewer sensors may be used, or additional sensors may be included in a conveyor belt, to provide more frequent upload of stored information relating to idler condition. Similarly, additional i-nodes may be installed at other locations along the conveyor belt system 100 to permit the use of sensors with smaller storage capacity or to provide failure resistant redundant communication, as well as more frequent uploads of stored information. Also, while eight idler rollers are shown in FIG. 1, it will be understood that in other embodiments more or fewer idlers may be used.

The wireless sensor systems 110, 112 and 114 have self-contained power supplies, which may include batteries or other power supply devices. Where the power supply is a battery, the battery may be selected to provide a lifetime of several years, in order to reduce the frequency of stopping the conveyor belt in order to replace the battery. Where the power supply is a rechargeable device, a recharge terminal 124 may be provided to recharge the power supply without requiring contact with the sensors. In the embodiment shown in FIG. 1, the recharge terminal 124 utilizes inductive power transfer to recharge the power supply in the sensor system 110.

The recharge terminal 124 also serves as a location reference for the sensors 110, 112 and 114 as they pass around the pulleys and idlers of the conveyor belt system 100. Where the conveyor belt 102 rotates in a clockwise direction, as viewed in FIG. 1, the idler assembly 108g is identified as the first idler encountered after passing the recharge terminal 124, followed in sequence by the head pulley 106, the idler pulley 108h, the idler assemblies 108f, 108d and 108b, the tail pulley 104, and the idler assemblies 108a, 108c and 108e. By using the recharge terminal 124 as a location reference, the sensors 110, 112 and 114 are able to identify stored information in a way that may be correctly interpreted by the monitor system 120.

It will be understood that in other embodiments, other location references may be provided for the sensors 110, 112 and 114. In one embodiment, the i-node 116 or other wireless device may provide a location reference. In another embodiment, a unique spacing between idler pulleys may be recognized as a location reference.

Figure 2:
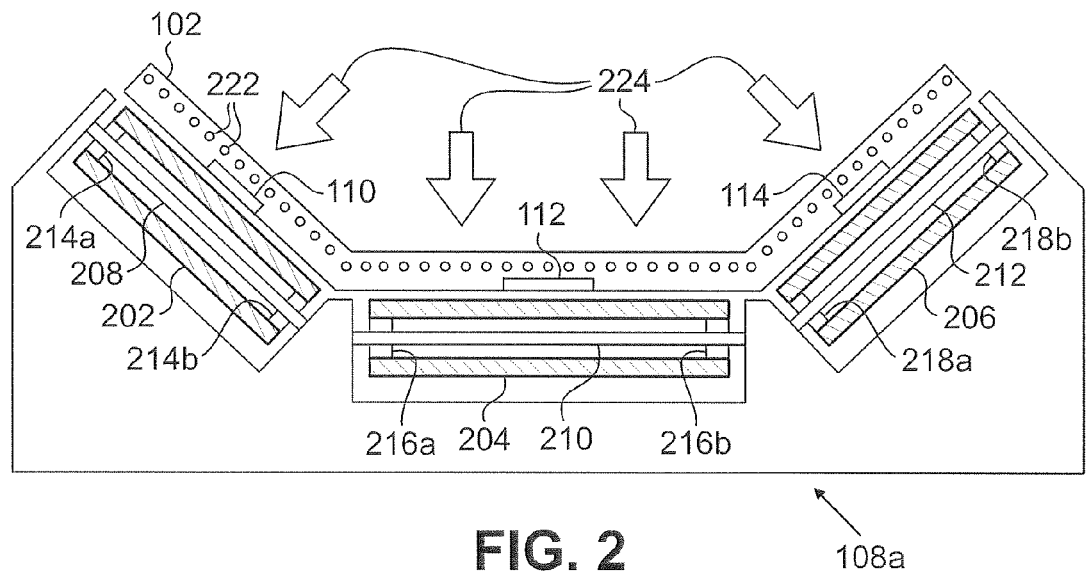
FIG. 2 is a cross section of a conveyor belt system in accordance with this disclosure.

FIG. 2 is a cross section of a conveyor belt system in accordance with this disclosure. The conveyor belt 102 of FIG. 1 lies atop an idler assembly 108a. The conveyor belt 102 is fabricated of rubber and is reinforced with steel cords 222. Embedded within the belt 102 and flush with, or adjacent to its inner surface (its lower surface in FIG. 2) are the wireless sensor systems 110, 112 and 114. The sensor systems 110, 112 and 114 may be encapsulated in rubber as a plug and glued or fastened by other means into position in the conveyor belt 102. While the sensors are typically spaced along the length of the belt 102, as shown in FIG. 1, they are shown within a single cross section of the belt 102 in FIG. 2 for ease of description.

While the embodiment of FIG. 2 is a rubber belt with steel cord reinforcements, in other embodiments the conveyor belt may be fabricated from other durable and flexible material, either with or without reinforcements. In still other embodiments, the conveyor belt may be linked segments of metal or other flexible or non-flexible material.

The idler assembly 108a includes three idler rollers 202, 204 and 206 spaced across the width of the conveyor belt 102, giving the belt 102 a U-shaped configuration when a force 224 that is exerted by material being carried by the belt 102 presses it into the idler rollers. The idler roller 202 rotates about an axle 208 and is supported on the axle 208 by idler bearings 214a and 214b. Similarly, the idler roller 204 rotates about an axle 210 and is supported by idler bearings 216a and 216b. The idler roller 206 rotates about an axle 212 and is supported by idler bearings 218a and 218b. The axles 208, 210 and 212 are supported by a base 220, which may be a solid structure, as shown in FIG. 2, or may be a cable running along the periphery of the conveyor belt system 100.

As will be described further with reference to FIG. 3, as sensor 110 passes over the idler roller 202, it senses one or more characteristics of the condition of the roller 202 and the bearings 214a and 214b. Similarly, the sensors 112 and 114 sense characteristics of the rollers 210 and 212, respectively, and their bearings.

Figure 3:
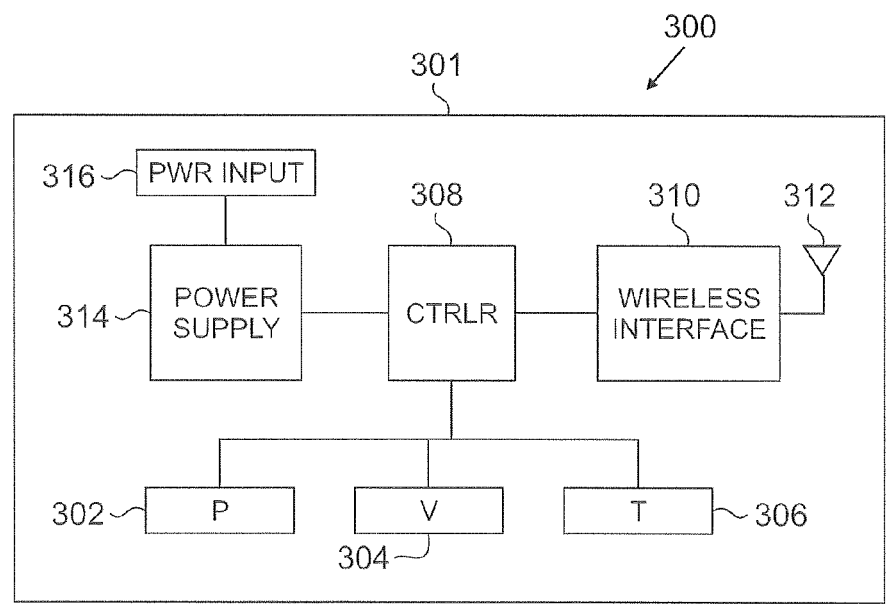
FIG. 3 is a schematic diagram of an in-belt wireless sensor in accordance with this disclosure.

FIG. 3 is a schematic diagram of an in-belt wireless sensor system 300 in accordance with this disclosure. The sensor system 300 includes a housing 301 that is adapted for fabrication or mounting within a conveyor belt. The sensor system 300 also includes a controller 308 that is powered by a power supply 314. Electrically coupled to the controller 308 are a pressure sensor 302, a vibration sensor 304, and a temperature sensor 306. The controller 308 is also electrically coupled to a wireless interface 310, which sends and receives wireless signals via an antenna 312.

As described with reference to FIG. 1, in some embodiments the power supply 314 may be a battery that is replaced when necessary. In other embodiments, the power supply 314 may be a rechargeable device and an optional power input device 316 may be included in the sensor system 300. The power input device 316 may include a coil, allowing inductive power coupling with a external device such as the recharge station 124 of FIG. 1. In still other embodiments, the power input device 316 may be a force transducer (such as a piezoelectric device) that converts some of the force experienced by the sensor when passing over an idler assembly into electrical power in order to recharge the power supply 316.

The wireless sensor system 300 determines that it is passing over an idler from an increase in pressure detected by the pressure sensor 302. In other embodiments, the system 300 may determine that a sensor is passing over an idler by another method, for example, an amount of time that has passed since the sensor passed a location reference. The controller 308 receives measurements of pressure, vibration and temperature, respectively, from the sensors 302, 304 and 306 before, during and after passage of the sensor system 300 over an idler. The controller 308 stores the measurements along with an identifier associated with the idler. As discussed with reference to FIG. 1, the identifier may be a sequence number indicating the idler's position in a sequence of idlers that follow a location reference.

When the controller 308 receives a poll message via the antenna 312 and the wireless interface 310 from a wireless transceiver such as the i-node 116 of FIG. 1, the controller 308 transmits some or all of the measurements and idler identifiers stored since the last poll message it received.

As described with reference to FIG. 1, the stored measurements are forwarded from the i-node 116 via the gateway 118 to the monitor system 120. The application may perform any necessary conversion on the received idler identifier and stores the measurements in a database arranged by idler identifier. The application then analyzes the received information, both within a single measurement and across a time series of measurements to detect characteristics and changes in characteristics of idlers.

Characteristics such as the condition of an idler roller surface, misalignment of a roller or bearing causing the idler to be out of true, the condition of idler bearings, and others may be determined from an analysis of various ones of the pressure, vibration and temperature measurements acquired and sent by the wireless sensor systems 110, 112 and 114. Responsive to a condition detected, the monitor system 120 may schedule maintenance on one of idler assemblies 108a-108h, change an operating characteristic of the conveyor belt system 100 or take some other appropriate action.

In other embodiments, sensors for characteristics other than pressure, vibration and temperature may be used. In still other embodiments some amount of calculation and analysis may be performed in the wireless sensor system 110, 112 or 114 prior to transmitting data to the i-node 116. In this way, the amount of data to be transmitted may be reduced from an embodiment that transmits raw measurement data from the sensor system.

This represents a brief description of one type of wireless sensor system 300 according to the present disclosure. Additional details regarding this type of wireless system are well-known in the art and are not needed for an understanding of this disclosure. Also, this represents one specific type of wireless sensor system 300 that may be used in the conveyor belt system 100. Other machines or devices could be used that include any other or additional components for wirelessly transmitting sensed information regarding idler assemblies. In addition, this disclosure is not limited to use with conveyor belt systems for transporting ore, coal and grain and could be used with conveyor belt systems that transport other items or materials.

The above description and its associated figures have described and illustrated various aspects of one particular implementation of the in-belt conveyor idler condition monitoring wireless sensor 300. Other embodiments of the wireless sensor system 300 could be used without departing from the scope of this disclosure.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of media.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
sensing a characteristic of a support structure of a conveyor belt using a sensor mechanically coupled to the conveyor belt;
wirelessly transmitting a signal corresponding to the sensed characteristic; and
determining a condition of the support structure based upon the transmitted signal.

2. The method of claim 1, wherein the support structure is a first support structure of a plurality of support structures, and wherein:
sensing a characteristic comprises sensing a characteristic of each of the support structures and associating the sensed characteristics with identifiers for the support structures;
wirelessly transmitting a signal comprises wirelessly transmitting one or more signals corresponding to the sensed characteristics and the associated identifiers for the support structures; and
determining a condition comprises determining a condition of each of the support structures based upon the one of more transmitted signals.

3. The method of claim 2, further comprising:
sensing a location reference; and
generating the identifiers for the support structures according to the location reference.

4. The method of claim 1, wherein the support structure comprises a plurality of elements, and wherein:
sensing a characteristic comprises sensing a characteristic of each of the elements using a corresponding plurality of sensors mechanically coupled to the conveyor belt;
wirelessly transmitting a signal comprises wirelessly transmitting one or more signals corresponding to the sensed characteristics of the elements; and
determining a condition comprises determining a condition of each of the elements based upon the one or more transmitted signals.

5. The method of claim 4, wherein:
the support structure is a first support structure of a plurality of support structures;
each of the support structures comprises a plurality of elements; and
sensing a characteristic comprises sensing a characteristic of a first of the elements for each of the support structures using a first of the sensors.

6. The method of claim 1, wherein wirelessly transmitting a signal comprises:
wirelessly transmitting a signal to an intermediate node; and
wirelessly transmitting the signal from the intermediate node.

7. The method of claim 1, wherein the characteristic is at least one of: pressure, vibration and temperature.

8. The method of claim 1, further comprising:
recharging a power supply of the sensor.

9. A system comprising:
a conveyor belt;
a support structure associated with the conveyor belt;
a sensor mechanically coupled to the conveyor belt; and
a monitor system;
wherein:
the sensor is operable to sense a characteristic of the support structure and to wirelessly transmit a signal corresponding to the sensed characteristic to the monitor system; and
the monitor system is operable to determine a condition of the support structure based upon the transmitted signal.

10. The system of claim 9, wherein:
the support structure is a first support structure of a plurality of support structures;

the sensor is operable to:
- sense a characteristic of each of the support structures and associate the sensed characteristics with identifiers for the support structures; and
- wirelessly transmit one or more signals corresponding to the sensed characteristics and the associated identifiers for the support structures; and the monitor system is operable to determine a condition of each of the support structures based upon the one or more transmitted signals.

11. The system of claim 10, wherein the sensor is operable to:
- sense a location reference; and
- generate the identifiers for the support structures according to the location reference.

12. The system of claim 9, wherein:
- the support structure comprises a plurality of elements;
- the sensor is a first sensor of a plurality of sensors mechanically coupled to the conveyor belt;
- each of the sensors is operable to sense a characteristic of a corresponding element of the support structure and wirelessly transmit a signal corresponding to the sensed characteristic to the monitor system; and
- the monitor system is operable to determine a condition of each of the elements based upon the transmitted signals.

13. The system of claim 12, wherein
- the support structure is a first support structure of a plurality of support structures;
- each of the support structures comprises a plurality of elements; and
- each of the sensors is operable to sense a characteristic of one of the elements in each of the support structures.

14. The system of claim 9, further comprising an intermediate node, wherein:
- the sensor is operable to transmit the signal corresponding to the sensed characteristic to the intermediate node; and
- the intermediate node is operable to transmit the signal corresponding to the sensed characteristic to the monitor system.

15. The system of claim 9, wherein the characteristic is at least one of: pressure, vibration and temperature.

16. The system of claim 9, wherein the sensor comprises a rechargeable power supply and the sensor is further operable to recharge the power supply without stopping a motion of the conveyor belt.

17. A system comprising:
- a sensor mechanically coupled to a conveyor belt and operable to:
  - detect a characteristic of a support structure associated with the conveyor belt; and
  - produce a first signal responsive to the detected characteristic;
- a controller operable to:
  - receive the first signal from the sensor;
  - store the first signal; and
  - produce a second signal according to the stored first signal; and
- a wireless interface operable to receive the second signal and wirelessly transmit the second signal.

18. The system of claim 17, wherein:
- the conveyor belt passes over a plurality of support structures;
- the sensor is operable to detect a characteristic of each of the support structures over which the conveyor belt passes and to produce a plurality of first signals responsive to the detected characteristics; and
- the controller is operable to:
  - associate an identifier for the corresponding support structure with each first signal;
  - store each associated first signal and identifier; and
  - produce the second signal according to the stored associated first signals and identifiers.

19. The system of claim 18, wherein the sensor is operable to:
- sense a location reference; and
- generate the identifiers for the support structures according to the location reference.

20. The system of claim 17, wherein the sensor comprises a rechargeable power supply and the sensor is further operable to recharge the power supply without stopping a motion of the conveyor belt.

* * * * *